(12) United States Patent
Griffith

(10) Patent No.: US 10,219,131 B1
(45) Date of Patent: Feb. 26, 2019

(54) INVITE SYSTEM FOR MOBILE APPLICATIONS

(71) Applicant: Gametime, San Francisco, CA (US)

(72) Inventor: Brad Griffith, San Francisco, CA (US)

(73) Assignee: Gametime, San Francisco, CA (US)

( * ) Notice: Subject to any disclaimer, the term of this patent is extended or adjusted under 35 U.S.C. 154(b) by 0 days.

(21) Appl. No.: 14/300,153

(22) Filed: Jun. 9, 2014

Related U.S. Application Data

(60) Provisional application No. 61/832,891, filed on Jun. 9, 2013.

(51) Int. Cl.
*H04M 3/42* (2006.01)
*H04W 4/60* (2018.01)

(52) U.S. Cl.
CPC .................................. *H04W 4/60* (2018.02)

(58) Field of Classification Search
None
See application file for complete search history.

(56) References Cited

U.S. PATENT DOCUMENTS

| 2009/0041224 | A1* | 2/2009 | Bychkov et al. ........ 379/216.01 |
| 2009/0177744 | A1* | 7/2009 | Marlow et al. ............... 709/204 |
| 2010/0049852 | A1* | 2/2010 | Whitnah ................ G06Q 10/10 709/226 |

* cited by examiner

*Primary Examiner* — Jinsong Hu
*Assistant Examiner* — Alexander J Yi
(74) *Attorney, Agent, or Firm* — FSP LLC

(57) ABSTRACT

An invite aggregation, storage and optimization system preserves/enhances users' social capital by increasing the probability of user invite acceptance over a set of potential users given a set of current users.

16 Claims, 8 Drawing Sheets

| TIME | SENDING COMPONENT | SIGNAL | RECEIVING COMPONENT |
|---|---|---|---|
| 1. | SMS LOG 102 | SMS | CLIENT DEVICE APP 106 |
| 1. | SPEED DIAL 104 | SPEED DIALS | CLIENT DEVICE APP 106 |
| 1. | CONTACTS 108 | CONTACTS | CLIENT DEVICE APP 106 |
| 1. | CALL LOG 112 | CALL | CLIENT DEVICE APP 106 |
| 1. | EMAIL SYSTEM 122 | EMAIL | CLIENT DEVICE APP 106 |
| 2. | CLIENT DEVICE APP 106 | PERSONAL CONNECTIONS | INVITE SYSTEM 110 |
| 2. | SOCIAL NETWORK 114 | PERSONAL CONNECTIONS | INVITE SYSTEM 110 |
| 3. | INVITE SYSTEM 110 | INVITEE LIST | NOTIFIER 116 |
| 4. | NOTIFIER 116 | INVITATION | CLIENT DEVICE 118 |
| 4. | INVITE SYSTEM 110 | INVITATION | INVITE DATABASE 120 |

FIG. 2

INVITE SYSTEM FOR MOBILE APPLICATIONS

CROSS-REFERENCE TO RELATED APPLICATIONS

This application claims benefit under 35 U.S.C. 119 to U.S. application Ser. No. 61/832,891, filed on Jun. 9, 2013, which is incorporated herein by reference in its entirety.

BACKGROUND OF THE INVENTION

Invite systems often place the application developer's and user's interests at odds. Most existing mobile invite systems simply present potential invitees alphabetically. Below are summarized approaches from some well-known existing companies:

Path: (email addresses sorted alphabetically)
Zynga (in their hit Running with Friends game, contacts sorted by activity or alphabetically)
Fancy: (current users first, then sorted alphabetically)
Facebook: (sorted by mutual friend count)

Current systems do not apply feedback loops to inform the ranking of potential invitees, as it appears that their sorting is purely one dimensional (alphabetical or activity-based or mutual friend count).

BRIEF SUMMARY OF THE INVENTION

Not Applicable.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 is an action flow diagram of an embodiment of an invite process.

DETAILED DESCRIPTION OF THE INVENTION

Glossary

Figure 1:
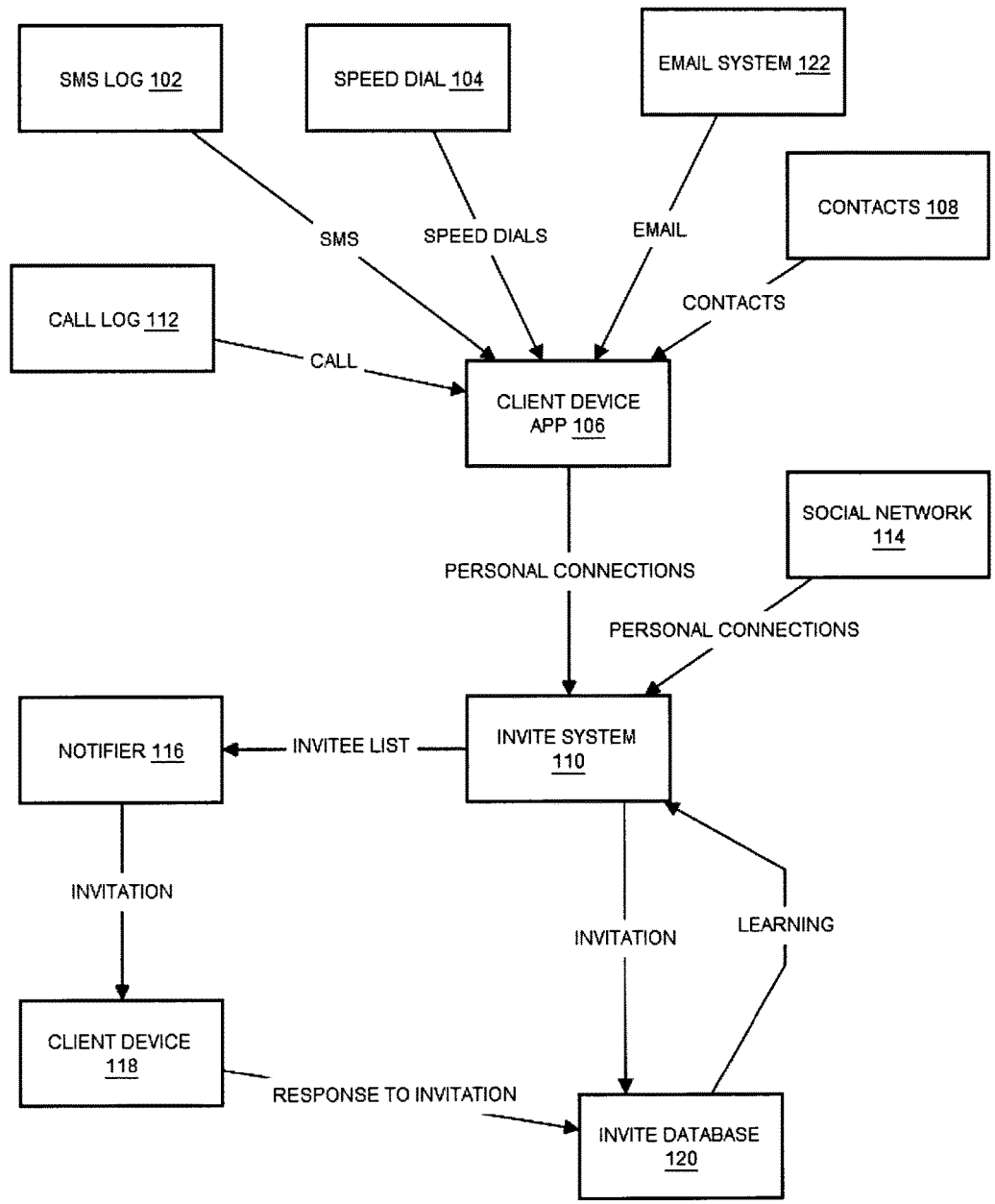
FIG. 1 is a system diagram of an embodiment of an invite system

"App" in this context refers to (Application) a distinct set of logic that provides specific functionality for phones. Phones may come with some apps built-in, and may allow others to be downloaded and installed by the user. Examples of apps include: to-do list, game, drawing tool, calculator, email, web browser, game, photo editor, and a weather forecast tool.

"Apple iOS" in this context refers to Apple Computer's mobile operating system developed and originally released on the Apple iPhone and the Apple iPod Touch. Several years later it was renamed to iOS and was extended to support other Apple devices such as the iPad and the Apple TV.

"Application" in this context refers to logic that can be independently installed, accessed, and removed from a device, and which executes at lower permission levels and within confines as to functionality and device resource utilization as determined by operating system software. Often referred to as ï¿½regularï¿½ application logic, as opposed to driver, applet, or system logic; also, logic that causes a computer to perform tasks beyond the basic operation of the computer itself. The term "application" may be abbreviated in some contexts to simply "app". An application may be logic built upon or integrated with operating system logic. Examples of application logic include enterprise software, accounting software, office suites, graphics software, games, web browsers, and media players. Applications may be bundled with the computer and its system software or published separately. Application logic applies the capabilities of a particular computing platform or system software to a particular purpose. Some applications are available in versions for several different platforms; others have narrower requirements and are thus called, for example, a Geography application for Windows or an Android application for education or Linux gaming.

"Database" in this context refers to an organized collection of data (states of matter representing values, symbols, or control signals to device logic), structured typically into tables that comprise 'rows' and 'columns', although this structure is not implemented in every case. One column of a table is often designated a "key" for purposes of creating indexes to rapidly search the database.

"Email" in this context refers to a form of electronic or optical communications between devices, which takes the form of exchanging messages from an author to one or more recipients. Email communications typically operates across the Internet or other device networks.

"mobile device" in this context refers to any device that includes logic to communicate over a machine network and having a form factor compatible with being carried conveniently by a single human operator. Mobile devices typically have wireless communications capability via WAPs or cellular networks.

"network" in this context refers to a telecommunications network that allows computers to exchange data. In computer networks, networked computing devices pass data to each other along data connections. The connections (network links) between nodes are established using either cable media or wireless media.

"Operating system (OS)" in this context refers to logic that manages device hardware resources and provides common services for application logic. The operating system is a vital component of many devices, such as computers and mobile phones. Application logic usually requires an operating system in order to function. Operating systems typically manage utilization of device resources, such as I/O devices, displays, processor utilization, memory, mass storage, and printing. The operating system acts as an intermediary between applications and the hardware resources, although applications are often (though not always, in the case of virtual machines) executed directly by the device hardware (e.g., one or more CPUs) and will frequently make system calls to the operating system, or be interrupted by it. Operating systems can be found on almost any device that contains a programmable processor or controller, from cellular phones and video game consoles to supercomputers and web servers.

"SMS" in this context refers to (short message service) a text messaging communication technique using standardized communications protocols that enable the exchange of short text messages between cellular devices.

"Social Media" in this context refers to logic to define and enable interactions among people in which they create, share, and exchange information and ideas in virtual communities and networks. Social media utilizes mobile and web-based technologies to create highly interactive platforms through which individuals and communities share, co-create, discuss, and modify user-generated content.

"Speed Dial" in this context refers to a feature present on communication devices that allows the user to program a button from the alphanumeric keypad to automatically dial a custom phone number upon a press of the button "Web site" in this context refers to a set of one or more web pages served from a single web domain. A web site is presented for access by external devices by at least one web server, and accessible via a network such as the Internet or a private local area network through an Internet address known as a Uniform Resource Locator.

DESCRIPTION

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, tangible machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

"engine" in this context refers to logic that inputs signals that affect internal processes of the logic to generate deterministic outputs, typically in a manner optimized for efficiency and speed (vs. size or machine resource utilization).

"online" in this context refers to connected to, served by, or available through a system and especially a computer or telecommunications system (as the Internet).

A system is described herein that facilitates users inviting qualified friends to mobile apps (for example). Some mobile phone operating systems (e.g., Apple iOS6 and later) grant developers access to the address book (contacts data). That data may be combined with social media data, e.g. with Facebook data (matching by name when necessary), to suggest invites. In one embodiment, the system user grants access for a mobile device application (app) to access their online social data, and the user grants access to the app to access their mobile device contacts, call log, SMS log, or speed dial data. A matching and recommendation engine creates a list of suggested invitees. The user invites acquaintances. Results are communicated back to the system to help further optimize the process. The system preserves/enhances users' social capital by improving the probability of user invite acceptance over a set of potential users given a set of current users.

The system in one embodiment includes logic operable to form a weighted presence metric for potential invitees in a user device's contact database, speed dial, SMS log, or call log (or any combination of these), and to combine the weighted presence with weighted social media data for the potential invitees. The system may include an aggregation component to aggregate and store correlation vectors and invite responses. The weights given to contact data for potential invitees are influenced by a feedback loop from the aggregator. For example, the weights may be influenced by responses of prior invitees having similar correlation vectors. The weights may influenced by presence of a contact in a speed dial. The weights may be influenced by a frequency and/or duration of presence in dialed or received calls or SMS or email.

In one embodiment, connections are implied by the presence of data about another person in a contact list. For example, the presence of communication options (phone number(s), email address(es), social network username(s)) to contacts in a person's mobile address book can indicate the strength of a relationship.

This contact list data is combined with data from other sources (social networks and other sites) by matching names, usernames, area codes, home cities, and other data. If a match is found, the full data set is applied to determine an invitation score for each potential invitee. Those potential invitees are sorted and the top ones are presented to the user as recommended invites.

The system improves over time by learning and retaining values of each dimension in the correlation vector. To enable this, the aggregation system may in one embodiment store invite information as follows:

Timestamp Sent, Channel (e.g., SMS, email, etc.), Invite Text (e.g. "Hey Phil, join me on X app, Brad"), SenderID (e.g., Brad12345), RecipientIDs (eg Phil12345, Sam12345—could be a single recipient or multiple recipeients in one invite), Result (e.g.,—Accepted, Not Yet Accepted), Timestamp Accepted (could be nil), User Data: (for both sender and recipient), Timestamp Signup, Phone number, Email address, Social data (likes, follows, locations, comments, etc.)

In one embodiment the system also stores the OS Type (iOS, Android, etc.) The phone number may be an essential part of this identification. AT, Verizon, etc. have their own prefixes which are the Y's in the XXX-YYY-ZZZZ format.

By understanding the Y's, the likelihood of an OS being utilizes may be approximated, even for unknown users (e.g.,—AT is likely iOS and Verizon is likely Android).

The invite system may in some embodiments also store relationship data, for example:

Phone connections (e.g., the presence of one or more of the recipient's phone numbers on the sender's phone), Email connections (same as above), Social connections (the presence of connections via social service APIs)

The system applies invite and relationship data to learn the optimal weighting of vectors on the likelihood of acceptance of the invitation and tune the system over time. For example, if the sender has multiple phone numbers for the recipient, this may indicate a strong connection and the recipient will be more likely to accept an invitation. As another example, the recipient may also have expressed explicit or implicit interest on social networks. A feedback loop affects how much that interest is weighed in invitation suggestions.

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

DRAWINGS

Figure 3:
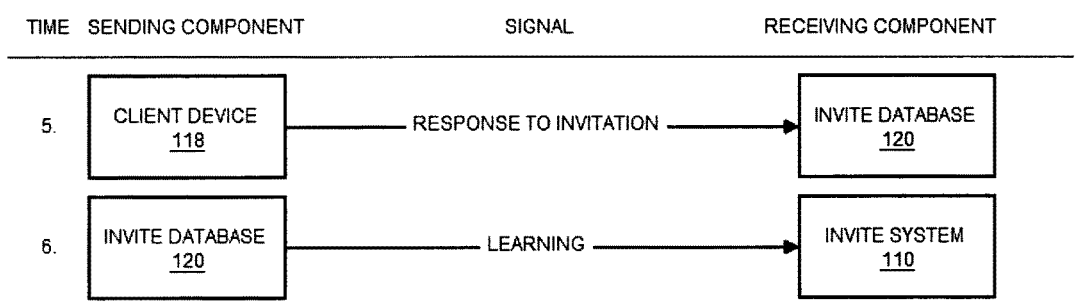
FIG. 3 is an action flow diagram of an embodiment of an invite process.
Figure 4:
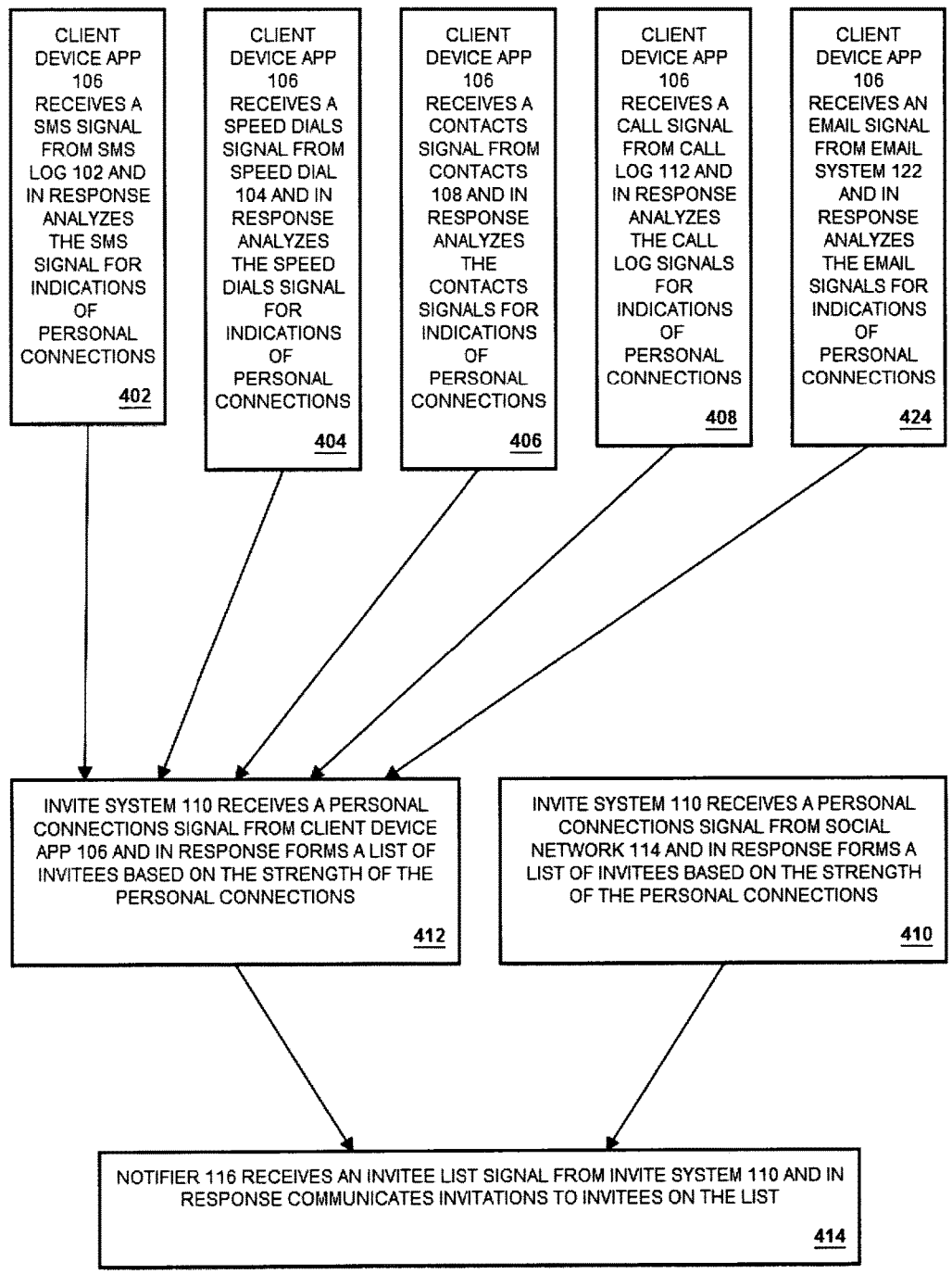
FIG. 4 is a flow chart of an embodiment of an invite process.
Figure 5:
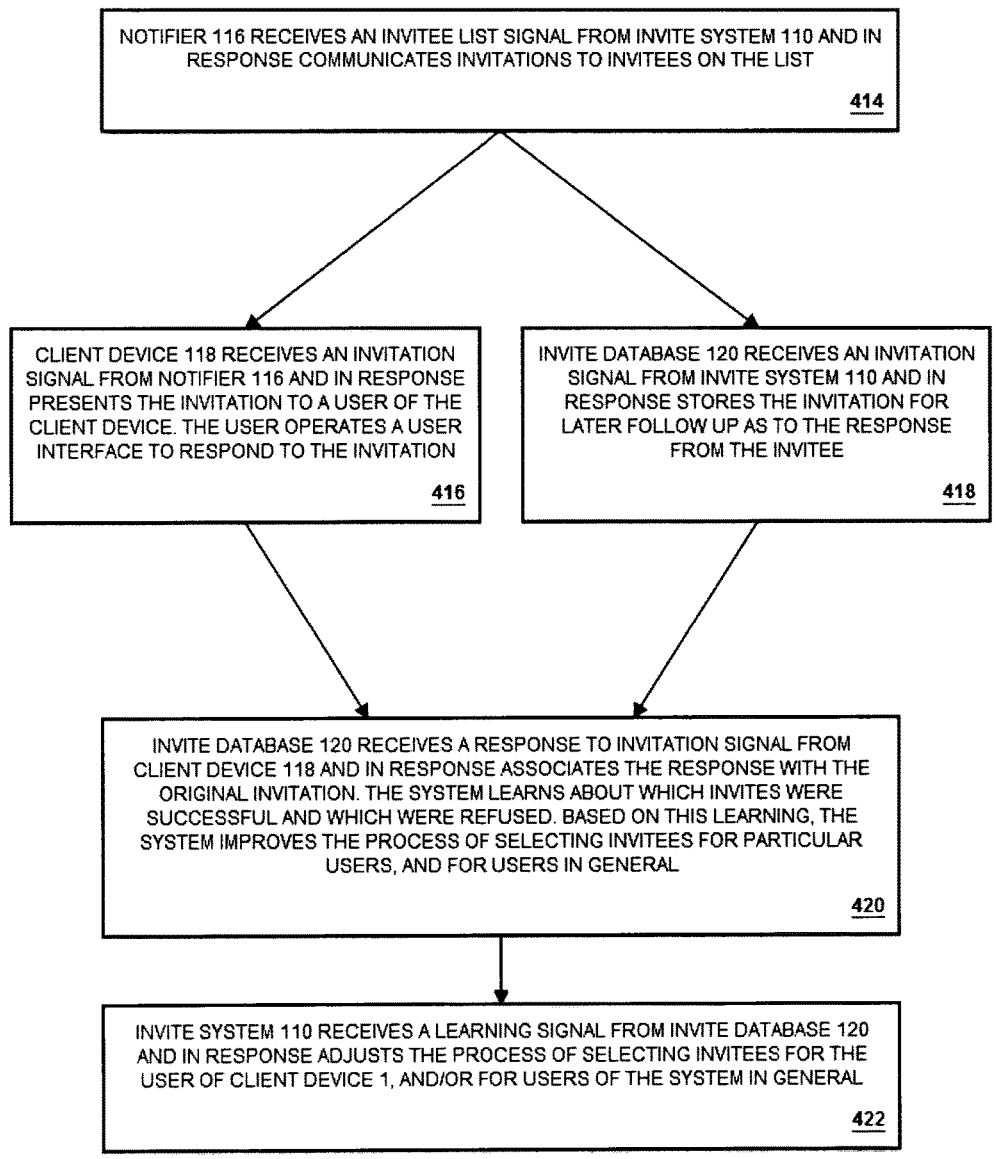
FIG. 5 is a flow chart of an embodiment of an invite process.

FIG. 1 is a system diagram of an embodiment of an invitation system. FIG. 2-3 is an action flow diagram of an embodiment of an invitation process. FIG. 4-5 is a flow chart of an embodiment of an invitation process. Collectively, these drawings illustrate an embodiment of a system that sends out invitations to people having a personal connection with a device user. The invitations can be for any reason, but in one embodiment are invitations to have special representation and treatment in a mobile application, such as an application to transact event tickets. The system comprises SMS log 102, speed dial 104, client device app 106, contacts 108, invite system 110, call log 112, social network 114, notifier 116, client device 118, and invite database 120.

The client device app 106 receives SMS signals from an SMS log 102 of the client device app 106 (which can be a mobile phone in many cases), and in response analyzes the SMS signals for indications of personal connections (402). A greater number of SMS signals, for instance, may indicate a stronger personal connection between a user of the client device app 106 and a sender or recipient of the SMS signals. The client device app 106 also receives speed dials signals from a speed dial 104 configuration, and in response analyzes the speed dials signals for indications of personal connections (404). The fact that a contact is represented by speed dial at all may be an indication of a strong personal connection. The client device app 106 also receives contacts signals from a contacts 108 database, and in response analyzes the contacts signals for indications of personal connections (406). The client device app 106 also receives call signals from a call log 112, and in response analyzes the call log signals for indications of personal connections (408). A mobile application (app) of the client device may perform all of this analysis. In some cases, the client device app 106 may simply pass the various signals over a network to a server system that performs the analysis for personal connections.

The invite system 110 receives the personal connections signals from the client device app 106 and in response forms a list of invitees based on the strength of the personal connections (412). The invite system 110 may also receive personal connections from a social network 114 system, particularly a social graph for the user of the client device app 106, and in response forms a list of invitees based on the strength of the personal connections (410) indicated by the social graph. The notifier 116 receives an invitee list signal from invite system 110 and in response communicates invitations to invitees on the list (414). The notifier may be informed of an email address, phone number, name (for social media messaging), or other means of contacting the invitees. This information may come from the various invitee sources described previously. The client device 118 receives an invitation signal from the notifier 116 and in response presents the invitation to a user of the client device. The user of client device 118 operates a user interface to respond to the invitation (416).

The invite database 120 also receives the invitation signal from the invite system 110. In response it stores the invitation (e.g., in machine memory) for later follow up as to the response from the invitee (418). At some future time, the invite database 120 receives a response to the invitation signal from the client device 118 and in response associates the response with the original invitation. The system learns about which invites were successful and which were refused. Based on this learning, the system improves the process of selecting invitees for particular users, and for users in general (420). The invite system 110 receives a learning signal from invite database 120 (i.e., about whether the invitation was accepted or refused) and in response adjusts the process of selecting invitees for the user of client device app 106, and/or for users of the system in general (422).

Figure 6:
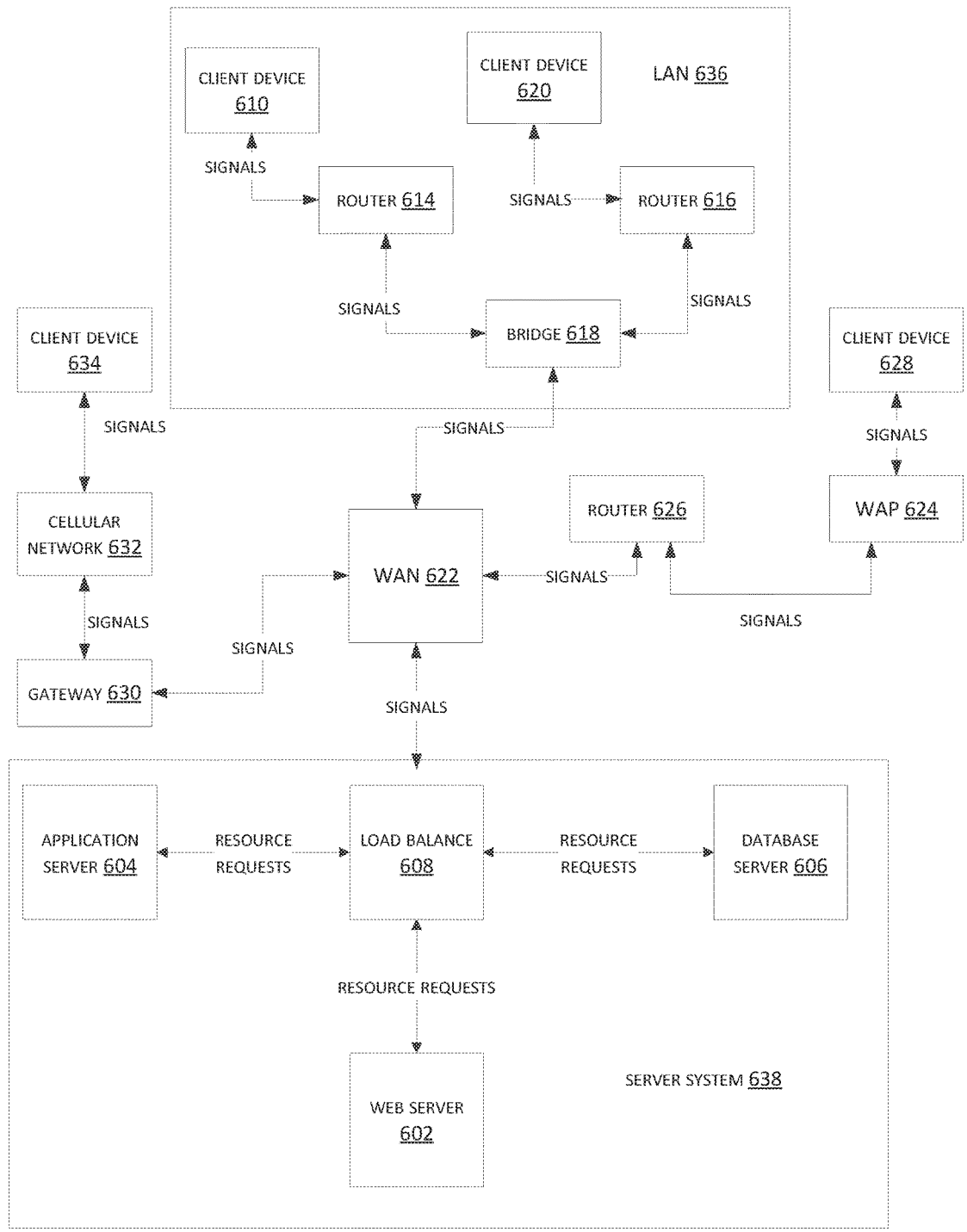
FIG. 6 is an embodiment of an invite system.

An invite system as described herein may be implemented in one embodiment by the machine system illustrated in FIG. 6. Several network access technologies between client devices and server resources are illustrated, including cellular network 632, LAN 636, and WAP 624. Signals representing server resource requests are output from client devices 610, 620, 628>, and 634 to the various access networks, from which they are propagated to a WAN 622 (e.g., the Internet) and from there to a server system. These signals are typically encoded into standard protocols such as Internet Protocol (IP), TCP/IP, and HTTP. When the clients are part of a LAN 636, the signals may be propagated via one or more router 614 616 and a bridge 618. A router 626 may propagate signals from the WAP 624 to the WAN 622. A gateway 630 may propagate signals from the cellular network 632 to the WAN 622. The server system 638 in this example comprises a number of separate server devices, typically each implemented in the separated machine, although this is not necessarily the case. The signals from the client devices are provided via a load balancing server 608 to one or more application server 604 and one or more database server 616. Load balancing server 608 maintains an even load distribution to the other server, including web server 602, application server 604, and database server 606. Each server in the drawing may represent in effect multiple servers of that type. The load balancing server 608, application server 604, and database server 606 may collectively implement an invite system as described herein. The signals applied to the database server 606 may cause the database server 606 to access and certain memory addresses, which correlates to certain rows and columns in a memory device. These signals from the database server 606 may also be applied to application server 604 via the load balancing server 608. Signals applied by the application server 604, via the load balancing server 608, to the web server 602, may result in web page modifications which are in turn communicated to a client device, as described herein in regards to user interface and interaction signals to and from a client device. The invite system described herein may thus be implemented as devices coordinated on a LAN, or over a wide geographical area utilizing a WAN or cellular network, or over a limited area (room or house or store/bar) utilizing a WAP. Features of client logic to process call logs, SMS, email, speed dials, etc. into personal connections may thus be implemented, for example, as an application (app) on a mobile phone interfacing to a network in one of the manners illustrated in this figure. The invite system described herein may be implemented as a pure or hybrid peer to peer system in a local or widely distributed area.

Figure 7:
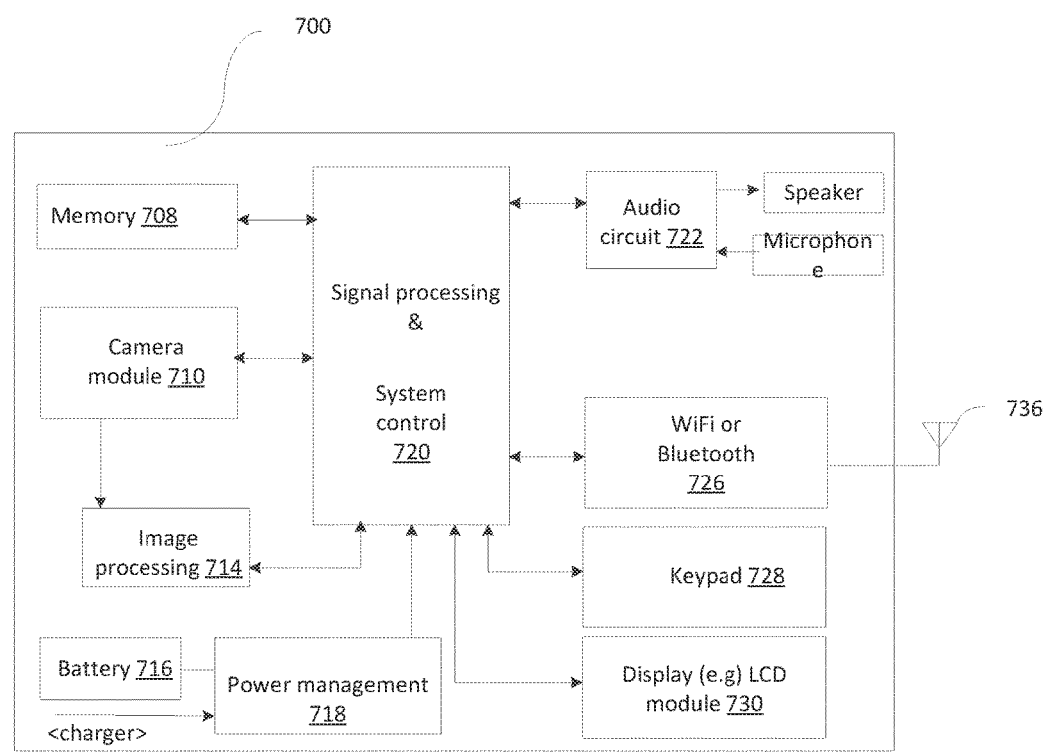
FIG. 7 is an embodiment of a mobile device.

FIG. 7 illustrates a mobile device 700 that may implement an embodiment of logic to process call logs, SMS logs, email, speed dials, etc. into personal connections. Logic 720 provides device system control over other components and coordination between those components as well as signal processing for the device. Signal processing and system control logic 720 extracts baseband signals from the radio frequency signals received by the device, and processes baseband signals up to radio frequency signals for communications transmitted from the device. Logic 720 may comprise a central processing unit, digital signal processor, and/or one or more controllers or combinations above these components. The device may further comprise memory 708 which may be utilized by the central processors, digital signal processors in controllers of the systems logic 720.

A camera module 710 may interface to a camera device to capture images and video from the environment. These images and video may be provided to an image processing module 714 for enhancement, compression, and other processing, and from there to the central control logic 420 for further processing and storage to memory 708.

Images, video and other display information, for example, user interface optical patterns, may be output to a display module 730 which may for example operate as a liquid crystal display or may utilize other optical output technology. The display module 730 may also operate as a user input device, being touch sensitive where contact or close contact by a use's finger or other device handled by the user may be detected by transducers. An area of contact or proximity to the display module 730 may also be detected by transducers and this information may be supplied to the control logic 720 to affect the internal operation of the mobile device 700 and to influence control and operation of its various components.

Audio signals may be provided to an audio circuit 722 from which signals output to one and more speakers to create pressure waves in the external environment representing the audio.

The mobile device 700 may operate on power received from a battery 716. The battery capability and energy supply may be managed by a power management module 718.

Another user interface device operated by control logic 720 is a keypad 728 which responds to pressure or contact events by a user of the device. As noted the keypad may in some cases be implemented by transducers of the display module 730.

The mobile device 700 may generate short range wireless signals to influence other devices in its proximity, and may receive wireless signals from those proximate devices using antenna 736. Short range radio signals may influence the device, or be generated by the device for output to the environment, through a BlueTooth or WiFi module 726. Other forms of electromagnetic radiation may be used to interact with proximate devices, such as infrared (not illustrated).

The mobile device 700 may convert audio phenomenon from the environment into internal electro or optical signals by using microphone and the audio circuit 722.

Figure 8:
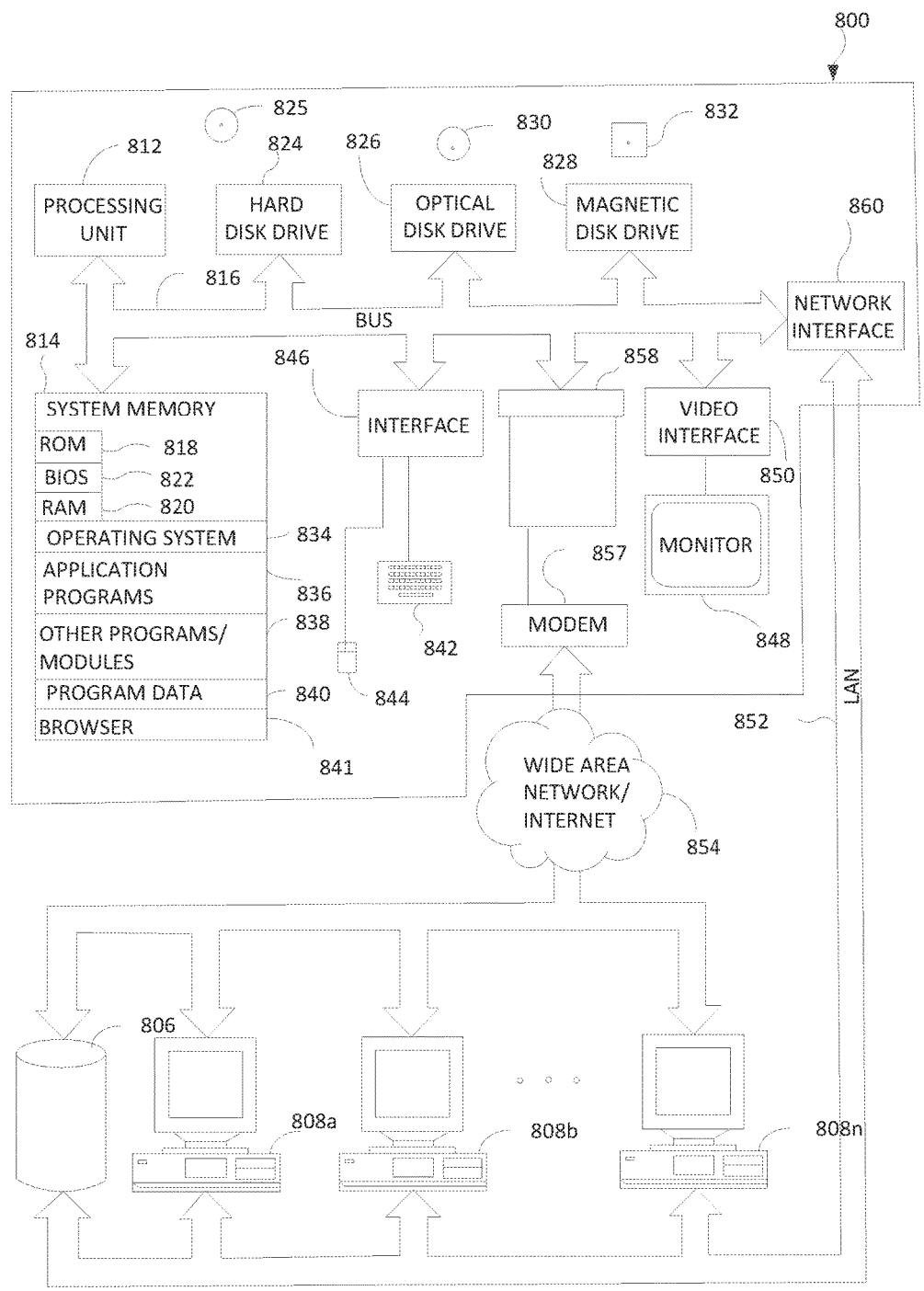
FIG. 8 an is an embodiment of a computer system machine and a machine communication network.

FIG. 8 illustrates an embodiment of a computer system machine and a machine communication network. The computer system 800 may implement an embodiment of various components of an invite system, for example as illustrated in FIG. 1. A particular computer system 800 of the machine network may include one or more processing units 812, a system memory 814 and a system bus 816 that couples various system components including the system memory 814 to the processing units 812. The processing units 812 may be any logic processing unit, such as one or more central processing units (CPUs), digital signal processors (DSPs, application-specific integrated circuits (ASICs), field programmable gate arrays (FPGAs), etc. The system bus 816 can employ any known bus structures or architectures, including a memory bus with memory controller, a peripheral bus, and a local bus. The system memory 814 includes read-only memory (ROM) 818 and random access memory (RAM) 820. A basic input/output system (BIOS) 822, which can form part of the ROM 818, contains basic routines that help transfer information between elements within the computer system 800, such as during start-up.

The computer system 800 may also include a plurality of interfaces such as network interface 860, interface 858 supporting modem 857 or any other wireless/wired interfaces.

The computer system 800 may include a hard disk drive 824 for reading from and writing to a hard disk 825, an optical disk drive 826 for reading from and writing to removable optical disks 830, and/or a magnetic disk drive 828 for reading from and writing to magnetic disks 832. The optical disk 830 can be a CD-ROM, while the magnetic disk 832 can be a magnetic floppy disk or diskette. The hard disk drive 824, optical disk drive 826 and magnetic disk drive 828 may communicate with the processing unit 812 via the system bus 816. The hard disk drive 824, optical disk drive 826 and magnetic disk drive 828 may include interfaces or controllers (not shown) coupled between such drives and the system bus 816, as is known by those skilled in the relevant art. The drives 824, 826 and 828, and their associated computer-readable storage media 825, 830, 832, may provide non-volatile and non-transitory storage of computer readable instructions, data structures, program modules and other data for the computer system 800. Although the depicted computer system 800 is illustrated employing a hard disk 824, optical disk 826 and magnetic disk 828, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 812.

Program modules can be stored in the system memory 814, such as an operating system 834, one or more application programs 836, other programs or modules 838 and program data 840. Application programs 836 may include instructions that cause the processor(s) 812 to automatically provide dynamic selection of data and telecommunication service providers before or during communications between various devices such as, for example, a mobile device and a landline telephone. Other program modules 838 may include instructions for handling security such as password or other access protection and communications encryption. The system memory 814 may also include communications programs, for example, a Web client or browser 841 for permitting the computer system 800 to access and exchange data with sources such as Web sites of the Internet, corporate intranets, extranets, or other networks and devices as described herein, as well as other server applications on server computing systems. The browser 841 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 814, the operating system 834, application programs 836, other programs/modules 838, program data 840 and browser 841 can be stored on the hard disk 825 of the hard disk drive 824, the optical disk 830 of the optical disk drive 826 and/or the magnetic disk 832 of the magnetic disk drive 828.

An operator can enter commands and information into the computer system 800 through input devices such as a touch screen or keyboard 842 and/or a pointing device such as a mouse 844, and/or via a graphical user interface. Other input devices can include a microphone, joystick, game pad, tablet, scanner, etc. These and other input devices are connected to one or more of the processing units 812 through an interface 846 such as a serial port interface that couples to the system bus 816, although other interfaces such as a parallel port, a game port or a wireless interface or a universal serial bus (USB) can be used. A monitor 848 or other display device is coupled to the system bus 816 via a video interface 850, such as a video adapter. The computer system 800 can include other output devices, such as speakers, printers, etc.

The computer system 800 can operate in a networked environment using logical connections to one or more remote computers and/or devices. For example, the computer system 800 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks. Communication may take place between the computer system 800 and external devices via a WAN 854 or LAN 852. External devices may include other computer system 808*a*-*n* (collectively, 808) and external storage devices 806.

What is claimed is:

1. A non-transitory computer readable medium in a machine system, comprising: instructions to collect from a mobile device personal connection links and records for a user of the mobile device; instructions to weigh the personal connection links and records by metrics of strength inherent in the personal connection links and records to form weights;
    instructions to apply the weights to form invitations to join a mobile device application of the mobile device of the user, and to communicate the invitations from the mobile device to recipient devices; and
    instructions to operate a feedback loop to increase the weights for invitees who have not accepted the invitation and who have similar correlation vectors to correlation vectors of invitees communicating acceptance of the invitations, wherein the correlation vectors are a measure of similarity between the invitees and the feedback loop increases the weights as a result of receipt by the mobile device of the acceptance of the invitations from the recipient devices.

2. The non-transitory computer readable medium in the system of claim 1, further comprising: instructions to access a social media web site for a social graph and to apply data from the social graph to form the invitations.

3. The non-transitory computer readable medium in the system of claim 1, further comprising: aggregation instructions configured to aggregate and store correlations between the invitations and responses to the invitations.

4. The non-transitory computer readable medium in the system of claim 1, further comprising: the weights influenced by the feedback loop from an aggregator.

5. The non-transitory computer readable medium in the system of claim 1, further comprising: the weights influenced by presence of the invitees in a speed dial memory configuration.

6. The non-transitory computer readable medium in the system of claim 1, further comprising: the weights influenced by a frequency or duration of presence of the invitees in call logs of the mobile device.

7. The non-transitory computer readable medium in the system of claim 1, further comprising: the weights influenced by presence of the invitees in SMS logs of the mobile device.

8. The non-transitory computer readable medium in the system of claim 1, further comprising: the weights influenced by presence of the invitees in email of the mobile device.

9. A process comprising:
    collecting from a mobile device personal connection links and records for a user of the mobile device;
    weighing the personal connection links and records by metrics of strength inherent in the personal connection links and records to form weights;
    applying the weights to form invitations to recipient devices to join a mobile device application of the mobile device of the user;
    communicating the invitations as signals over a machine data network;
    detecting return signals from the machine data network indicative of responses to the invitations from the recipient devices; and
    applying the responses to the invitations from the recipient devices by the mobile device to operate a feedback loop on the mobile device to increase the weights for invitees who have not accepted the invitation, and
    the invitees who have not accepted the invitation having similar correlation vectors to correlation vectors of invitees communicating acceptance of the invitations from the recipient devices, wherein the correlation vectors are a measure of similarity between the invitees.

10. The process of claim 9, further comprising: extracting a social graph for a sender of the invitations from a social media web site and applying data from the social graph to form the invitations.

11. The process of claim 9, further comprising: aggregating and storing in a machine database correlations between the invitations and responses to the invitations.

12. The process of claim 9, further comprising: the weights influenced by the feedback loop from an aggregator.

13. The process of claim 9, further comprising: the weights influenced by presence of the invitees in a speed dial memory configuration.

14. The process of claim 9, further comprising: the weights influenced by a frequency or duration of presence of the invitees in call logs of the mobile device.

15. The process of claim 9, further comprising: the weights influenced by presence of the invitees in SMS logs of the mobile device.

16. The process of claim 9, further comprising: the weights influenced by presence of the invitees in email of the mobile device.

* * * * *